Dec. 5, 1950    M. C. PATTERSON    2,532,935
BODY TRAILER AND BODY HAULING APPARATUS
Filed Oct. 24, 1947    2 Sheets-Sheet 2
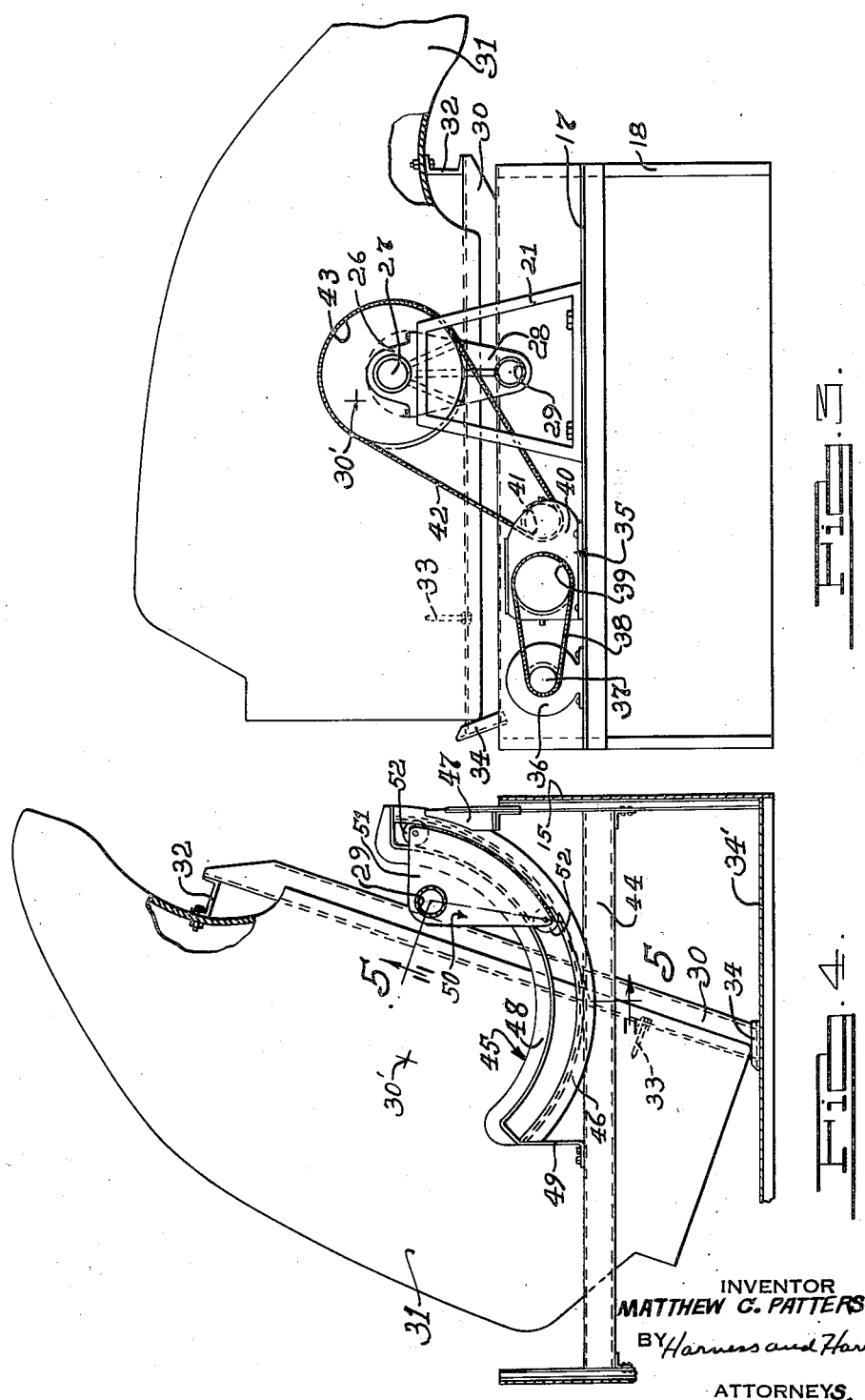
INVENTOR
MATTHEW C. PATTERSON
BY Harness and Harris
ATTORNEYS.

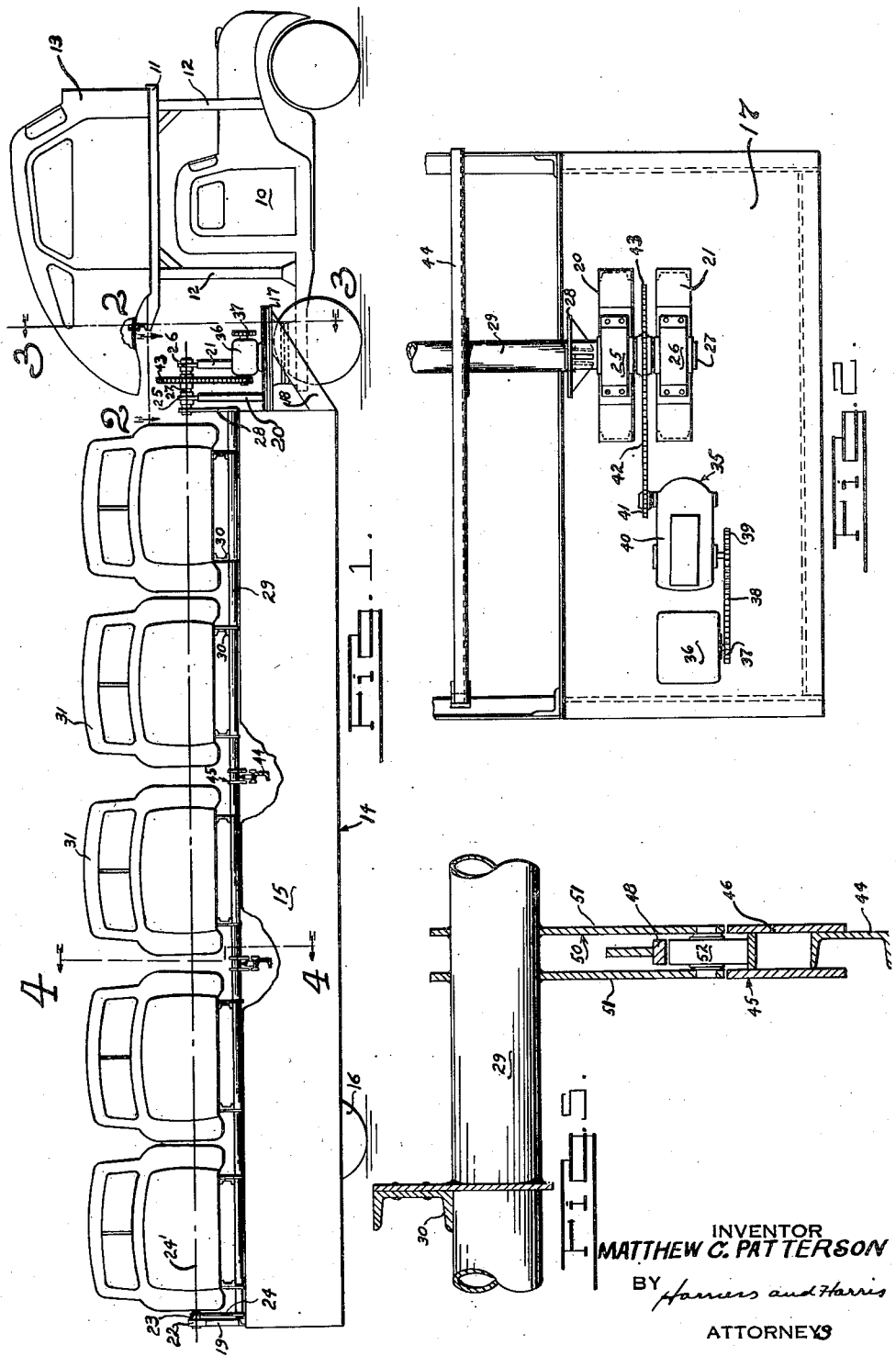

Patented Dec. 5, 1950　　　　　　　　　　　　　　　　　　　　　　　　　　　2,532,935

UNITED STATES PATENT OFFICE 2,532,935

BODY TRAILER AND BODY HAULING APPARATUS

Matthew C. Patterson, Grosse Pointe Park, Mich., assignor to Chrysler Corporation, Highland Park, Mich., a corporation of Delaware Application October 24, 1947, Serial No. 781,881

8 Claims. (Cl. 214—65)

My invention relates to trailers for transporting motor vehicle bodies and more particularly to the provision in trailers of this type of improved apparatus for positioning such bodies in an upwardly inclined arrangement.

The transportation of motor vehicle bodies by trailers in the past has been greatly hindered because the length of the bodies has been greater than the permissible width of the trailer, thereby causing the ends of the bodies to protrude over the sides of the trailers when such bodies have been arranged transversely of the lengths of the trailers. This protrusion is undesirable because in many localities the laws prohibited the use of trailers on public thoroughfares when the trailers or the loads thereon were wider than a prescribed dimension.

The principal object of my invention is to provide in a trailer for carrying vehicle bodies, improved apparatus for so angularly positioning and supporting the bodies on the trailer that their longitudinal axes are disposed at an acute angle to a vertical plane.

Other objects of the invention are to provide in a trailer of this kind a longitudinally extending swingably mounted shaft member which is provided with a plurality of transversely arranged vehicle body supporting racks, to provide means for swingably supporting such a shaft and its racks for revolving movement about an axis which is spaced from the axis of the shaft and disposed in comparatively close proximity to the center of gravity of each vehicle body mounted on the racks, to provide arcuate track and carriage member for supporting the shaft at a plurality of locations intermediate its ends and which do not in any way interfere with the movement of the bodies by the body supporting and manipulating apparatus and to provide apparatus of this kind which requires comparatively low driving torque to swing a plurality of vehicle bodies from a horizontal loading position to an upwardly inclined transporting position.

Another object of the invention is to provide a swingably mounted shaft of the foregoing character which is asymetrically positioned with respect to the width of the trailer so as to accommodate location of the axis of revolution of the shaft in close proximity to the center of gravity of each body.

In the drawings:

Fig. 1 is a side elevational view of a truck and vehicle carrying trailer embodying my invention.

Fig. 2 is a fragmentary plan view of the power mechanism of the trailer taken in the direction of the arrows from the horizontal plane of the line 2—2 of Fig. 1.

Fig. 3 is a transverse vertical sectional view of the vehicle trailer embodying my invention taken on the line 3—3 of Fig. 1.

Fig. 4 is a transverse vertical sectional view of the trailer taken on the line 4—4 of Fig. 1 showing a vehicle body in its upwardly inclined transporting position.

Fig. 5 is a vertical sectional view taken on line 5—5 of Fig. 4.

Referring now to Fig. 1, I have shown a truck 10 of the conventional type having a structure 11 supported by members 12 mounted above it for carrying the body 13. The truck 10 is of the type adapted to transport a trailer 14. The trailer 14 comprises a body portion 15, a pair of conventional wheels 16 for facilitating movement of the trailer 14, and a platform 17 supported by corner supports 18 at the truck end of the trailer. The trailer is also provided with three bearing supports 19, 20 and 21 which are aligned longitudinally of the trailer. The support 19 is mounted on the extremity of the trailer body portion 15 furtherest from the truck 10, and the supports 20 and 21 are mounted adjacent the other extremity of the trailer on the platform 17.

The support 19 has journaled in its bearing 22 a crank pin 23 of a crank 24 which is supported for rotation about an axis 24'. The supports 20 and 21 similarly have journaled in their respective bearings 25 and 26 a shaft 27 to which is fixed one extremity of a crank 28 which is also supported for rotation about the same axis. The bearings 22, 25, and 26 are so arranged as to have a common axis extending longitudinally of the trailer. An elongated shaft 29 extending longitudinally of the trailer connects the free extremities of the cranks 24 and 28 and is adapted to revolve in a circular path about the common axis.

The shaft 29 is provided with a plurality of aligned vehicle body supporting frame structures or racks 30 which are arranged transversely of the trailer and mounted on the shaft 29 in spaced relationship. The racks 30 are adapted to carry vehicle bodies 31, the bodies being secured to the structures by means of clamping devices 32 which may comprise any suitable clamps, or bolts, such as shown at the rear ends of the bodies, which are receivable in registering apertures in the bodies 31 and racks 30. Pilot pins 33, carried by the racks 30 locate and secure the front ends of the bodies against displacement. The bodies 31 are so positioned relative to the shaft 29 that when the shaft 29 is in its lowest position, as viewed in Fig. 3, the bodies 31 are disposed in a substantially horizontal plane. This facilitates convenient loading of vehicle bodies upon the trailer. When the shaft 29 is revolved in a counterclockwise direction from the position shown in Fig. 3 to the position shown in Fig. 4, the bodies 31 are inclined until the shoes 34 on the forward extremities of the frame structures 30 engage and rest upon the floor 34' of the body portion 15. During this operation, all of the vehicle bodies carried by the shaft 29 are simultaneously moved from a horizontal loading position to an inclination at an acute angle to a vertical plane.

In order to prevent the shaft 29 from bending downwardly at locations intermediate its ends under the weight of the vehicle bodies, the body portion 15 of the trailer is provided with horizontal supports 44 positioned transversely of the trailer and having arcuate tracks generally designated by the numeral 45 mounted thereon. Each track comprises a lower section 46 secured at its central portion to the horizontal support 44 and its outer extremity to the body portion 15 by a bracket 47 and an upper section 48 of a T-shaped cross section uniformly spaced from the lower section 46 and having its inner extremity mounted on the horizontal support 44 by a flange 49 projecting downwardly from the upper sections 48 and its outer extremity of the lower section 46 of the track 45. The inner extremity of the lower section 46 is supported by the flange 49 of the upper section 48. These parts of the track structure may be welded or secured together by some suitable means.

The shaft 29 is supported intermediate its ends by a plurality of spaced carriages 50 which ride on the arcuate tracks 45. Each carriage comprises a pair of substantially triangular plates 51 welded or otherwise fixed to the shaft 29 adjacent one corner. The track and carriage may be seen more clearly in Figs. 4 and 5. The plates 51 extend downwardly from the shaft 29 receiving the upper section 48 of the track 45 therebetween. A roller 52 is journaled between the triangular plates 51 at one of the other corners of the plates and a roller 53 is journaled between these plates at the remaining corner. The carriage 50 is so positioned that the rollers 52 and 53 move in the path defined by the upper and lower section 46 and 48 of the track.

Therefore, since the arcuate track has a contour corresponding to the path of the shaft 29 when revolved, the carriages 50 by sliding along the track, support the shaft in all positions of the bodies.

A power unit 35 which is mounted on the platform 17 is provided to mechanically revolve the shaft 29 from its loading position illustrated in Fig. 3 to its transporting position shown in Fig. 5. The power unit 35, as more clearly shown in Fig. 2, comprises a motor 36 having a gear 37 which is connected by means of a chain 38 to a driving gear 39 of a gear mechanism generally shown at 40 which multiplies the torque applied by the motor 36. A driven gear 41 of the gear mechanism 40 is connected by a chain 42 to a large gear 43 which is keyed to the shaft 27 between the bearings 25 and 26. Rotation of the motor 36 drives the large gear 43 at a slower rate and with a greater torque than that of the motor 36 since the speed of the rotation of the motor is greatly reduced by the gear mechanism 40. Therefore, when the motor 36 is energized, the shaft 29 revolves in an arcuate path until the bodies 31 are inclined as shown in Fig. 4.

By revolving the shaft 29 about the common axis 24' of the bearings 22, 25, and 26, which is laterally offset, as shown in Fig. 3, from the longitudinal central plane of the trailer a considerable reduction is made in the torque required to turn the vehicle bodies to their transporting positions, for with this construction, the axes 24' can be brought to or within close proximity to the centers of gravity indicated in Figs. 4 and 5 by the numeral 30' of the vehicle bodies 31 thereby requiring less power from the power unit 35 to incline the bodies. The clamping devices 32 and pilot pins 33 are so located on the racks 30 as to uniformly position the bodies 31 with their centers of gravity aligned longitudinally of the trailer. Any departure of the axis 24' from the aligned centers of gravity of the bodies should be, as shown in the drawings, in a direction such that the unbalanced weight of the bodies tends to retain them in their inclined positions.

Although but one specific embodiment of the invention is herein shown and described, it will be understood that various changes in the sequence of operations, steps and materials employed may be made without departing from the spirit of the invention.

I claim:

1. Apparatus for positioning a vehicle body for, and supporting the same during transportation comprising a frame structure, a shaft swingably mounted on said frame structure having an axis of revolution substantially parallel to and spaced from its longitudinal central axis, crank members on the ends of said shaft having end portions pivotally mounted on said frame structure for swingably supporting said shaft with respect to said axis of revolution, a vehicle body supporting rack carried by said shaft, fixed against rotation relative thereto and adapted to receive the lower portion of a vehicle body, means for securing said vehicle body to said rack, and driving mechanism operatively connected with one of said crank members for swinging said shaft and said rack about said axis of revolution from a loading position to a transporting position.

2. Apparatus for positioning a vehicle body for and supporting the same during transportation comprising a frame structure, a shaft swingably mounted on said frame structure having an axis of revolution substantially parallel to and spaced from its longitudinal central axis, crank members on the ends of said shaft having end portions pivotally mounted on said frame structure for swingably supporting said shaft with respect to said axis of revolution, a vehicle body supporting rack on said shaft adapted to receive the lower portion of a vehicle body, means for securing said vehicle body to said rack, driving mechanism operatively connected with one of said crank members for swinging said shaft and said rack about said axis of revolution from a loading position to a transporting position, a carriage mounted on said shaft and having a roller positioned thereon, and an arcuate track mounted on said frame structure and adapted to receive said roller for supporting said shaft in all its positions.

3. In a device adapted to support a vehicle body, a shaft, means non-rotatively fixed to said shaft and adapted to secure said body thereto, a crank member having one extremity attached to one end of said shaft and having a journal portion on its other extremity mounted for rotation about an axis in proximity with the center of gravity of said body, and means for rotating said journal portion of said crank about said axis to induce arcuate revolving movement of said shaft and corresponding movement of said body to an inclined position.

4. In a vehicle body transporting trailer having an elongated frame structure; apparatus for simultaneously positioning a plurality of vehicle bodies for transportation and supporting them during transportation comprising a shaft extending longitudinally of said frame structure, spaced crank members swingably supporting said shaft for oscillative movement about an axis parallel to and spaced from said shaft, one of said crank members having a journal portion mounted on said frame structure for rotation about said axis, a plurality of vehicle body supporting racks mounted on said shaft and so arranged as to be disposed in a substantially horizontal loading position when said shaft is in its lower position, and mechanism for revolving said shaft and correspondingly revolving said racks from said loading position to a transporting position inclined at an acute angle to a vertical plane.

5. In a vehicle body transporting trailer having an elongated frame structure, apparatus for positioning a plurality of vehicle bodies for transportation and supporting them during transportation comprising a shaft extending longitudinally of said frame structure, spaced crank members at the opposite end portions of said shaft swingably supporting said shaft for oscillative movement about an axis parallel to and spaced from said shaft, one of said crank members having a journal portion mounted on said frame structure for rotation about said axis, a plurality of vehicle body supporting racks mounted on said shaft and so arranged to be disposed in a substantially horizontal loading position when said shaft is in its lower position, mechanism for revolving said shaft and correspondingly revolving said rack from said loading position to a transporting position inclined at an acute angle to a vertical plane, spaced carriages mounted on said shaft intermediate said racks and having rollers positioned thereon, and arcuate tracks mounted on said frame structure and adapted to receive said rollers for supporting said shaft in all its positions.

6. In a vehicle body transporting trailer having an elongated frame structure, apparatus for simultaneously positioning a plurality of vehicle bodies for transportation and supporting them during transportation comprising a shaft extending longitudinally of said frame structure, spaced crank members swingably supporting said shaft for oscillative movement about an axis extending longitudinally of and positioned asymetrically with respect to said frame structure and disposed parallel to and spaced from said shaft, one of said crank members having a journal portion mounted on said frame structure for rotation about said axis, a plurality of vehicle body supporting racks mounted on said shaft and so arranged to be disposed in a substantially horizontal loading position when said shaft is in its lower position, and means on said racks for so locating said vehicle bodies thereon as to bring their centers of gravity into substantial alignment and into close proximity to said axis for revolving said shaft and correspondingly revolving said rack from said loading position to a transporting position inclined at an acute angle to a vertical plane.

7. In a vehicle body transporting trailer having an elongated frame structure, apparatus for simultaneously positioning a plurality of vehicle bodies for transportation and supporting them during transportation comprising a shaft extending longitudinally of said frame structure, spaced crank members swingably supporting said shaft for oscillative movement about an axis extending longitudinally of and positioned asymetrically with respect to said frame structure and disposed parallel to and spaced from said shaft, one of said crank members having a journal portion mounted on said frame structure for rotation about said axis, a plurality of vehicle body supporting racks mounted on said shaft and so arranged to be disposed in a substantially horizontal loading position when said shaft is in its lower position, means on said racks for so locating said vehicle bodies thereon as to bring their centers of gravity into substantial alignment and into close proximity to said axis, power actuating mechanism for revolving said shaft and correspondingly revolving said racks from said loading position to a transporting position inclined at an acute angle to a verticle plane, carriages mounted on said shaft and having rollers positioned thereon, and arcuate tracks mounted on said frame structure and adapted to receive said rollers for supporting said shaft in all its positions.

8. In a vehicle body transporting trailer having an elongated frame structure, apparatus for simultaneously positioning a plurality of vehicle bodies for transportation and supporting them during transportation comprising a shaft extending longitudinally of said frame structure, spaced crank members swingably supporting said shaft for oscillative movement about an axis extending longitudinally of and positioned asymetrically with respect to said frame structure and disposed parallel to and spaced from said shaft, one of said crank members having a journal portion mounted on said frame structure for rotation about said axis, a plurality of vehicle body supporting racks transversely mounted on said shaft and so arranged to be disposed in a substantially horizontal loading position when said shaft is in its lower position, means on said racks for so locating said vehicle bodies thereon as to bring their centers of gravity into substantial alignment and into close proximity to said axis, power actuating mechanism for revolving said shaft and correspondingly revolving said rack from said loading position to a transporting position inclined at an angle to a vertical plane, carriages mounted on said shaft at positions intermediate said racks and having rollers positioned thereon, and arcuate tracks mounted on said frame structure and adapted to receive said rollers for supporting said shaft in all its positions.

MATTHEW C. PATTERSON.

REFERENCES CITED

The following references are of record in the file of this patent:

UNITED STATES PATENTS

| Number | Name | Date |
|---|---|---|
| 1,235,358 | Mayfield | July 31, 1917 |
| 1,750,128 | Romine | Mar. 11, 1930 |
| 1,824,369 | Reid et al. | Sept. 22, 1931 |
| 2,077,751 | Floss | Apr. 20, 1937 |
| 2,129,950 | Loney | Sept. 13, 1938 |
| 2,181,881 | Ferris | Dec. 5, 1939 |

FOREIGN PATENTS

| Number | Country | Date |
|---|---|---|
| 707,112 | Germany | June 13, 1941 |